(12) United States Patent
Vedula

(10) Patent No.: US 8,572,026 B2
(45) Date of Patent: Oct. 29, 2013

(54) DATA SYNCHRONISATION ACROSS MULTIPLE DATA STORAGES WHEN PROCESSING TRANSACTIONS RECEIVED ON A NETWORK

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1576 days.

(21) Appl. No.: 10/906,177

(22) Filed: Feb. 6, 2005

(65) Prior Publication Data

US 2006/0179081 A1 Aug. 10, 2006

(51) Int. Cl.
*G06F 17/00* (2006.01)

(52) U.S. Cl.
USPC ............................ 707/610; 707/613; 707/615

(58) Field of Classification Search
USPC .................. 707/204, 610, 613, 615
See application file for complete search history.

(56) References Cited

U.S. PATENT DOCUMENTS

| | | | |
|---|---|---|---|
| 6,169,794 B1 * | 1/2001 | Oshimi et al. ........... 379/221.09 |
| 6,295,541 B1 * | 9/2001 | Bodnar et al. ................. 707/203 |
| 6,330,568 B1 * | 12/2001 | Boothby et al. .............. 707/201 |
| 6,430,694 B1 * | 8/2002 | Hosein et al. ................. 713/400 |
| 6,438,563 B1 * | 8/2002 | Kawagoe ..................... 707/201 |
| 6,516,327 B1 * | 2/2003 | Zondervan et al. ........... 707/200 |
| 6,611,849 B1 * | 8/2003 | Raff et al. .............................. 1/1 |
| 6,704,755 B2 * | 3/2004 | Midgley et al. ............... 707/204 |
| 6,772,178 B2 * | 8/2004 | Mandal et al. ................ 707/204 |
| 6,779,002 B1 * | 8/2004 | Mwaura ................................ 1/1 |
| 6,779,003 B1 * | 8/2004 | Midgley et al. ............... 707/204 |
| 6,847,984 B1 * | 1/2005 | Midgley et al. ............... 707/204 |
| 6,862,617 B1 * | 3/2005 | Wu ................................ 709/224 |
| 6,868,428 B2 * | 3/2005 | Todokoro et al. ..................... 1/1 |
| 6,898,600 B2 * | 5/2005 | Fruchtman et al. ............ 707/10 |
| 6,957,221 B1 * | 10/2005 | Hart et al. ..................... 707/100 |
| 6,978,396 B2 * | 12/2005 | Ruuth et al. ...................... 714/6 |
| 7,069,227 B1 * | 6/2006 | Lintel et al. ...................... 705/4 |
| 7,174,479 B2 * | 2/2007 | Kutan et al. .................... 714/15 |
| 7,275,073 B2 * | 9/2007 | Ganji et al. ................... 707/201 |
| 7,596,713 B2 * | 9/2009 | Mani-Meitav et al. ...... 714/6.32 |
| 2002/0059299 A1 * | 5/2002 | Spaey ........................ 707/104.1 |
| 2003/0046434 A1 * | 3/2003 | Flanagin et al. .............. 709/248 |
| 2006/0004733 A1 * | 1/2006 | Zoltan et al. ..................... 707/3 |
| 2006/0106881 A1 * | 5/2006 | Leung et al. .................. 707/200 |

* cited by examiner

*Primary Examiner* — Thanh-Ha Dang
(74) *Attorney, Agent, or Firm* — Narendra Reddy Thappeta

(57) ABSTRACT

A synchronization unit examines the packets on a network to determine the changes being caused to a database server, and propagates the same changes to corresponding backup server (s). As the synchronization is implemented in a separate unit, the throughput performance of database servers may not be impeded due to the synchronization requirement.

17 Claims, 4 Drawing Sheets

DATA SYNCHRONISATION ACROSS MULTIPLE DATA STORAGES WHEN PROCESSING TRANSACTIONS RECEIVED ON A NETWORK

BACKGROUND OF THE INVENTION

1. Field of the Invention

The present invention relates to data storage systems such as databases, and more specifically to a method and apparatus for synchronizing data across multiple data storage systems when processing transactions received on a network.

2. Related Art

Data storage systems, such as database systems, are generally used to store data. The stored data can then be later accessed and used for various purposes, as is well known in the relevant arts.

The same data is often stored on multiple data storage systems. Such an approach provides several advantages such as having a backup storage system in case the other data storage systems fail for whatever reason. An another example, each data storage system can be used to serve different sets of users, thereby providing a superior throughput performance.

At least to maintain such same data on multiple data storage systems, there is a general need to synchronize the data across the data storage systems. Synchronization generally refers to effecting a change on all the data storage systems if the change is performed on one of the data storage systems. For convenience, the data storage system on which the change is to be performed (first) is referred to as a primary storage system, and the remaining data storage systems are referred to as backup storage systems.

One source of the changes are transaction requests (such as insert or update statements in SQL when the data storage system corresponds to a database system) received on networks. In such a scenario, the changes effected to the data in the primary storage system need to be propagated to the backup storage system as well.

In one prior approach, the primary storage system operates to propagate each change to the backup storage systems. One problem with such an approach is that the overhead to propagate changes may negatively impact the performance of the primary data server, which may be unacceptable in several situations.

Accordingly, what is needed is a method and apparatus which overcomes at least some of the problems noted above when synchronizing data across multiple data storage systems.

BRIEF DESCRIPTION OF THE DRAWINGS

The present invention will be described with reference to the accompanying drawings briefly described below.

Figure (FIG.) 1 is a block diagram of an example environment in which various aspects of the present invention can be implemented.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A synchronization unit provided according to an aspect of the present invention is designed to examine packets on a network and determine whether a transaction corresponding to a packet causes a change in a primary server. The synchronization unit then propagates the changes to any backup servers automatically. Since the primary server is relieved (at least substantially) of the task of propagating the changes, the throughput performance of primary server can be enhanced. In addition, the synchronization operations may also be performed quickly due to the use of a separate system for synchronization unit.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the present invention.

2. Example Environment

Figure 1:
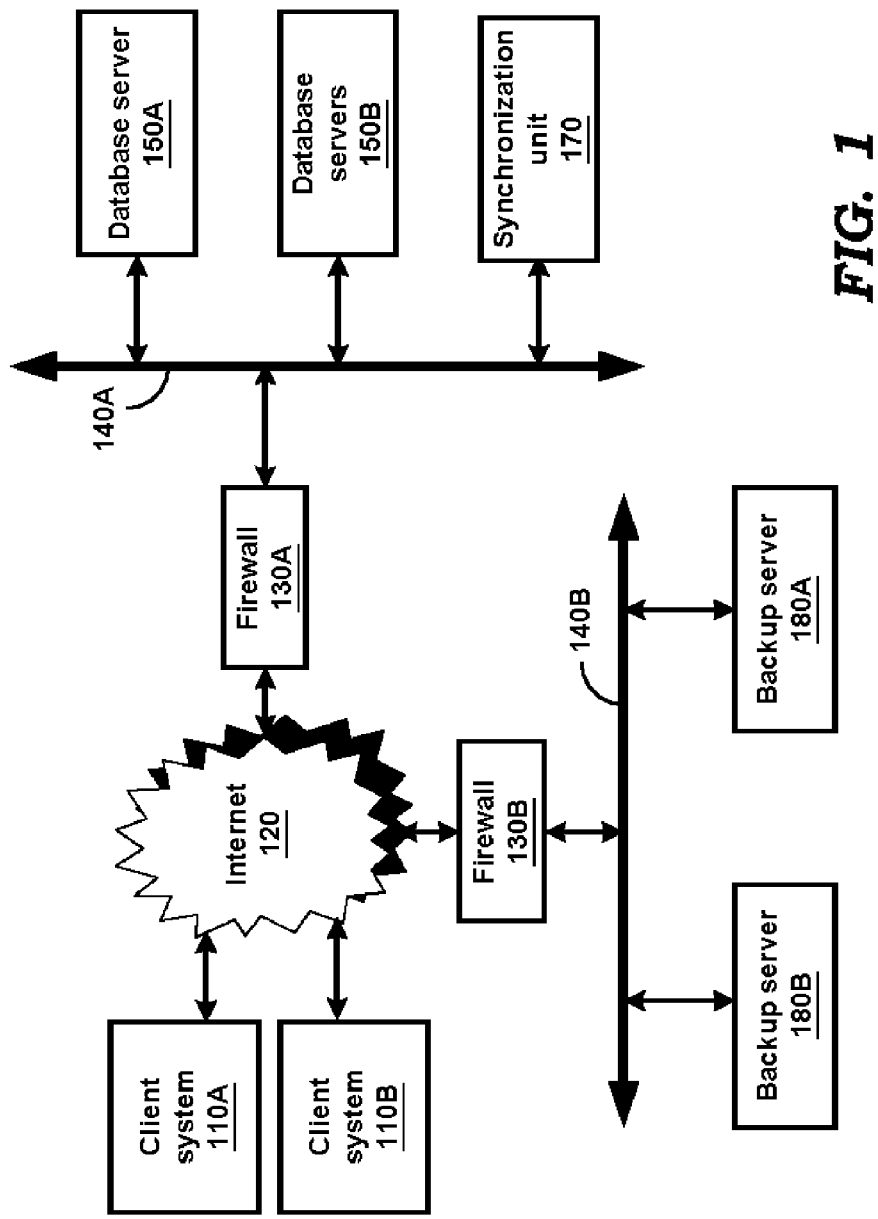

FIG. 1 is a block diagram illustrating an example environment in which various aspects of the present invention can be implemented. The environment is shown containing client systems 110A and 110B, Internet 120, firewalls 130A and 130B, local area networks 140A and 140B, database servers 150A and 150B, synchronization unit 170 and backup server 180A and 180B. Each component is described below in further detail.

Internet 120 generally refers to a conglomeration of networks connecting various systems, and is implemented using protocols such as Internet Protocol (IP). Local area networks (LANs) 140A and 140B can be implemented using protocols such as IP, ATM, frame relay, Ethernet, and is generally owned or operated by an organization.

Firewall 130A is implemented using routers/switches, and provides connectivity between systems connected to LAN 140-A and those accessible via Internet 120 (in addition to tasks such as preventing unauthorized access). Firewall 130B is implemented similarly. Client systems 110A and 110B establish database connections with database servers 150A and 150B, and send transaction requests causing the data stored in the servers to be changed.

Database servers 150A and 150B represent example data storage systems, in which data is stored. Database servers allow storing, retrieval and modifications of/to data using structured queries, as is well known in the relevant arts. Backup servers 180A and 180B respectively store the same data as database servers 150A and 150B, and thus there is a general need to synchronize backup server 180A with database server 150A, and backup server 180B with database server 150B.

Synchronization unit 170, provided according to an aspect of the present invention, ensures such synchronization based on packets transmitted on LAN 140A. In particular, synchronization unit 170 monitors the packets on LAN 140A to determine the changes to database server 150A/B, and causes the changes to be replicated on (or propagated to) corresponding backup servers.

As may be appreciated, synchronization unit 170 is provided external to the data storage systems, thereby avoiding degradation of throughput performance of the storage systems. The manner in which synchronization unit 170 may be implemented is described below with examples.

3. Operation of Synchronization Unit

Figure 2:
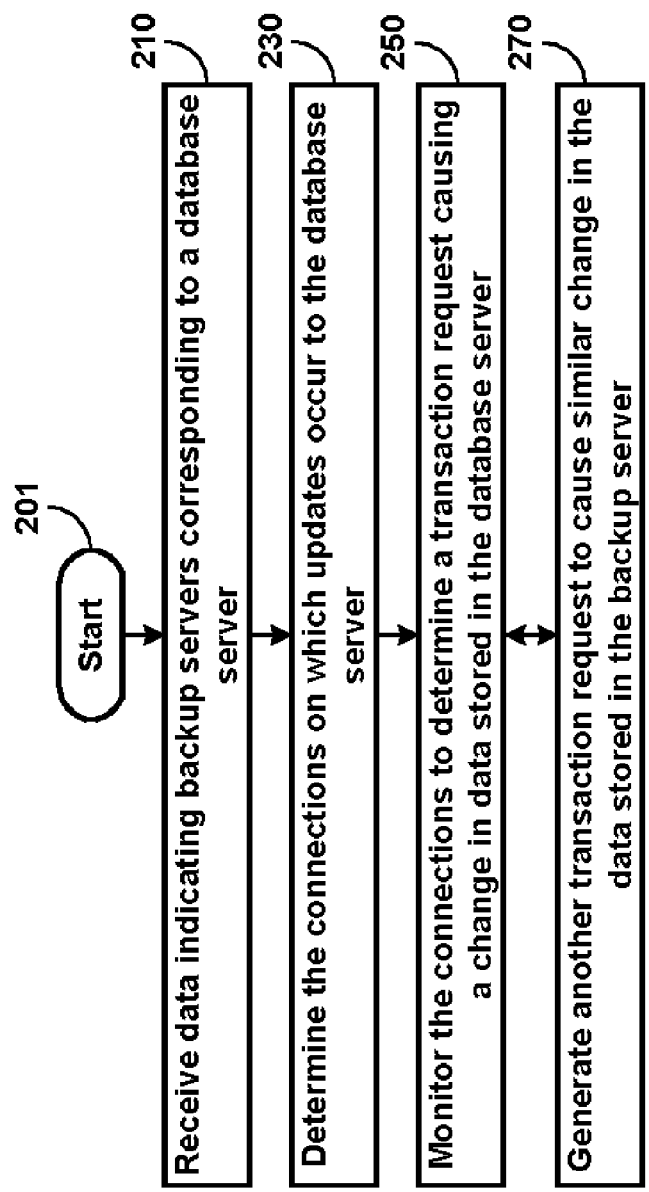
FIG. 2 is a flow-chart illustrating the manner in which a synchronization unit ensures that backup servers store the same data as primary servers according to various aspects of the present invention.

FIG. 2 is a flow-chart illustrating the manner in which a synchronization unit operates in an embodiment of the present invention. The flow chart is described with reference to FIG. 1 (and also with respect to one pair of database server and backup server) merely for illustration. However, the features can be implemented in other environments (and with more pairs of database servers and backups servers) as well. The flow chart begins in step 201, in which control immediately passes to step 210.

In step 210, synchronization unit 170 receives data indicating a backup server corresponding to a database server of interest. In an embodiment, a database administrator provides configuration data indicating backup servers corresponding to database servers of interest. Thus, in the scenario of FIG. 1, synchronization unit 170 is configured to indicate that backup servers 180A and 180B are respectively associated with database servers 150A and 150B.

In step 230, synchronization unit 170 determines the connections on which updates occur to database server 150A. The connections are determined according to the protocols using which client systems communicate with the database servers. The manner in which connections are determined in an example environment is described in a section below in further detail.

In step 250, synchronization unit 170 monitors the connections on LAN 140 to determine a transaction request causing a change in data stored in database server 150A. The determination generally needs to take into consideration the packet formats and protocol.

In step 270, synchronization unit 170 generates a transaction request to cause similar change in the data stored in backup server 150A. Accordingly, synchronization unit 170 needs to operate similar to client systems in initiating and completing (i.e., replicating the change) the transaction request on backup server 150A. Therefore, synchronization unit 170 may need to be provided the authorization to effect changes on the backup servers.

Control then passes to step 250 to process the next transaction on the determined connections. It should be further appreciated that additional connections (step 230) could be formed while the loop of steps 250 and 270 is being executed, and steps 250 and 270 need to be executed for each presently active connection (though not shown in the Figure). Similarly, the loop of steps 250 and 270 needs to end when a connection terminates.

From the above, it may be appreciated that the implementation of synchronization unit 170 needs to be consistent with the protocol and packet formats using which database updates (insert, change, delete) are performed. Accordingly, the implementation considerations with respect to an example protocol and packet format are described below.

4. Protocol Consideration

In TCP/IP environment, a transport connection is defined by the source IP address, destination IP address, source port and destination port, as is well known in the relevant arts. In general, to establish a database connection, client systems 110A sends a connection setup request to server system 150A at a pre-specified (destination) port. In one embodiment, the pre-specified port number equals 1521 (in decimal).

Server system 150A and client systems 110A can then be designed to setup a database connection on the same transport connection (as on which the connection setup request is received), or alternatively a new transport connection can be setup to support the desired database connection. The implementation of both approaches will be apparent to one skilled in the relevant arts, and different server systems can be implemented to setup database connections using different ones of the noted approaches.

Accordingly, it should be appreciated that synchronization unit 170 needs to be implemented to monitor packets on LAN 140A, consistent with the specific approach of database connection setup. One embodiment described below is implemented according to Net8 Protocol, which is described in further detail in a book entitled, "Oracle Net8: Configuration and troubleshooting", by Toledo et al, Publisher: O'Reilly; 1 edition (December, 2000), ISBN Number: 1565927532.

Once the connection is setup, synchronization unit 170 again needs to examine the packets consistent with the format using which transaction requests are presented on the database connections. Accordingly, the packet format in an example scenario is described below in further detail.

5. Packet Format

Figure 3:
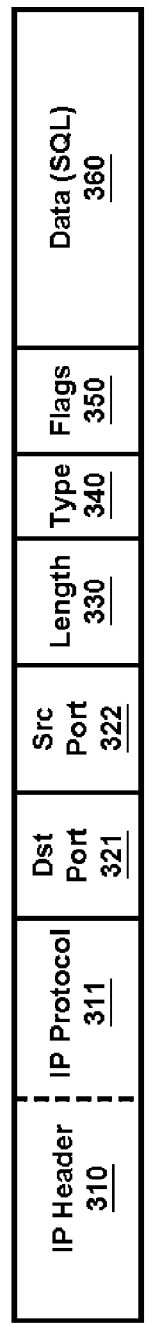
FIG. 3 contains a packet format illustrating the operation of synchronization unit in one embodiment.

FIG. 3 contains an example packet format using which database servers and client systems communicate in one embodiment. The packet format is shown with respect to TCP/IP for illustration, however other protocols can be used consistent with the approaches illustrated herein. For illustration, it is assumed that all database connection requests and transactions (and control packets) are on port 1521 of server system 150A/B.

IP header 310 indicates the source IP address and destination IP address in the corresponding fields. IP protocol field 311 contains a value representing TCP. Accordingly, fields 321 and 322 respectively contain source port number and destination port number.

Length field 330 is of 2 bytes long, and indicates the length of the data (in octets) from that point to the end of the packet. Flags field 350 contains flags, which can be used for various controls, and data field 360 stores data as appropriate for specific packet types.

Type field 340 indicates the specific purpose for which the present packet is directed. The type field can take on values 1 (database connection setup request), 2 (connection accept from the database server), 3 (refuse connection), and 6 (transaction request contained in the data field 360).

Thus, when a packet with type field 340 equaling 1 is followed by a packet with type field equaling 2 on LAN 140A, synchronization unit 170 determines that a database connection is setup between the corresponding client system and the database server. Then, synchronization unit 170 needs to examine packets on the same database connection with the type field set to value 6. The data in such packets indicates whether the packet contains a transaction request which would cause a change in database server 150A.

Synchronization unit 170 parses such packets to determine the specific change that is being caused in database server 150A, and causes the change to be propagated to backup server 180A. For example, the SQL query contained in the packet may be sent to backup server 180A to effect the same change, and thus achieve the desired synchronization. The packets between client systems and server systems may be continued to be monitored until the database connection is closed (e.g., by appropriate value in type field 340).

It should be understood that synchronization unit 170 can be implemented using a desired combination of hardware, software and firmware, as suited for a specific situation. The description is continued with respect to an embodiment in which various features are operative by execution of software instructions in a digital computer system.

6. Digital Processing System

Figure 4:
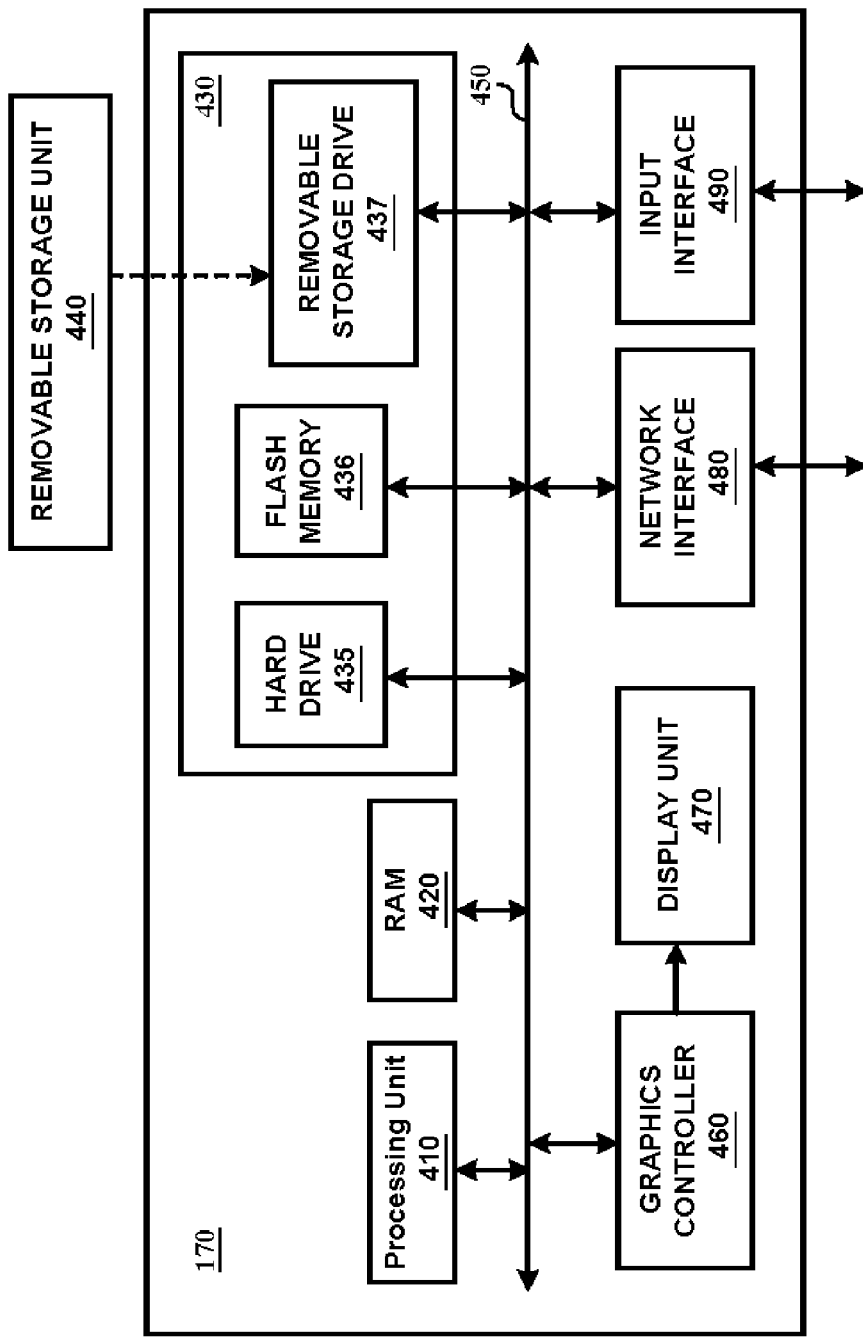
FIG. 4 is a block diagram illustrating an example embodiment in which various aspects of the present invention are operative when software instructions are executed.

FIG. 4 is a block diagram illustrating the details of synchronization unit 170 in which various aspects of the present invention are operative by execution of appropriate software instructions. Synchronization unit 170 may contain one or more processors such as central processing unit (CPU) 410, random access memory (RAM) 420, secondary memory 430, graphics controller 460, display unit 470, network interface 480, and input interface 490. All the components except display unit 470 may communicate with each other over communication path 450, which may contain several buses as is well known in the relevant arts. The components of FIG. 4 are described below in further detail.

CPU 410 may execute instructions stored in RAM 420 to provide several features of the present invention. CPU 410 may contain multiple processing units, with each processing unit potentially being designed for a specific task. Alternatively, CPU 410 may contain only a single general purpose processing unit. RAM 420 may receive instructions from secondary memory 430 using communication path 450.

Graphics controller 460 generates display signals (e.g., in RGB format) to display unit 470 based on data/instructions received from CPU 410. Display unit 470 contains a display screen to display the images defined by the display signals. Input interface 490 may correspond to a keyboard and/or mouse. Network interface 480 provides connectivity to a network (e.g., using Internet Protocol), and may be used both for monitoring packets on LAN 140A, as well as to send/receive IP packets.

Secondary memory 430 may contain hard drive 435, flash memory 436 and removable storage drive 437. Secondary memory 430 may store the data and software instructions, which enable server system 150 to provide several features in accordance with the present invention. Some or all of the data and instructions may be provided on removable storage unit 440, and the data and instructions may be read and provided by removable storage drive 437 to CPU 410. Floppy drive, magnetic tape drive, CD_ROM drive, DVD Drive, Flash memory, removable memory chip (PCMCIA Card, EPROM) are examples of such removable storage drive 437.

Removable storage unit 440 may be implemented using medium and storage format compatible with removable storage drive 437 such that removable storage drive 437 can read the data and instructions. Thus, removable storage unit 440 includes a computer readable storage medium having stored therein computer software and/or data.

In this document, the term "computer program product" is used to generally refer to removable storage unit 440 or hard disk installed in hard drive 435. These computer program products are means for providing software to server system 150. CPU 410 may retrieve the software instructions, and execute the instructions to provide various features of the present invention described above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as database.

What is claimed is:

1. A data management system comprising:
   a primary storage connected to a network and to store a data;
   a backup storage designed to store the same data as said primary storage;
   a client system to send a transaction request to said primary storage in the form of one or more packets on said network,
   wherein said transaction, upon being transported to said primary storage on said network and thereafter being processed in said primary storage causes a change to the data stored by said primary storage; and
   a synchronization unit to monitor said one or more packets on said network while being transported to said primary storage to determine the presence of said transaction request on said network, said synchronization unit then propagating the change to said backup storage based on the content of said one or more packets monitored while the packets are being transported from said client system to said primary storage on said network.

2. The data management system of claim 1, wherein said synchronization unit is provided as a separate unit external to each of said client system, said primary storage and said backup storage such that a throughput performance of said primary storage is not impeded due to a synchronization requirement of said backup storage with said primary storage, and wherein each of said primary storage, said backup storage, said client system and said synchronization unit are implemented as separate systems.

3. The data management system of claim 1, wherein said client system sends said transaction request in the form of a SQL (Structured query language) query in said one or more packets according to a prespecified format, said synchronization unit parses said packet and sends said SQL query to said backup storage to perform said propagating.

4. The data management system of claim 3, wherein said synchronization unit monitors said one or more packets on said network to determine a database connection setup by said client system to said primary storage, wherein said transaction request is then received on said database connection.

5. The data management system of claim 4, wherein said synchronization unit receives data indicating that a request for setting up said database connection would be received on a specified port of a transport connection to said primary storage, wherein said synchronization unit monitors said network for packets containing said specified port, wherein said specified port is a number.

6. The data management system of claim 4, wherein said synchronization unit is configured with a configuration to indicate that said backup storage is to be synchronized with said primary storage, wherein said synchronization unit performs said monitoring and synchronization in response to the configuration.

7. The data management system of claim 4, wherein said primary storage and said backup storage respectively comprise a primary server and a backup server.

8. A non-transitory computer readable medium storing one or more sequences of instructions enabling a synchronization unit to synchronize a backup storage with a primary storage, wherein execution of said one or more sequences of instructions by one or more processors contained in said synchronization unit causes said synchronization unit to perform the actions of:

monitoring one or more packets on a network to determine a transaction request, wherein said one or more packets are monitored when being transported from a client system to said primary storage, said one or more packets after being delivered at said primary storage and being processed at said primary storage being designed to cause a change to data stored in said primary storage; and propagating said change to said backup storage based on said monitoring of said one or more packets when being transported from said client system to said primary storage, wherein each of said synchronization unit, said client system, said backup storage and said primary storage are implemented as separate units, wherein said client system is implemented external to each of said synchronization unit, said backup storage and said primary storage.

9. The non-transitory computer readable medium of claim 8, wherein said monitoring examines packets on said network to determine a database connection being setup to said primary storage, wherein said transaction request is received on said database connection.

10. The non-transitory computer readable medium of claim 9, wherein said transaction request is in the form of a SQL query in said one or more packets, and wherein said propagating comprises sending said SQL query to said backup storage to cause said change on said backup storage.

11. The non-transitory computer readable medium of claim 10, wherein said primary storage and said backup storage respectively comprise a primary server and a backup server.

12. A method of synchronizing a backup storage with a primary storage, said method being performed in a synchronization unit, said method comprising:

monitoring one or more packets on a network to determine a transaction request causing a change to data stored in said primary storage, a client system sending said transaction request to said primary storage on said network in the form of said one or more packets, wherein said transaction, upon being transported to said primary storage on said network and thereafter being processed in said primary storage causes a change to the data stored by said primary storage, wherein said one or more packets are monitored when being transported from said client system to said primary storage on said network; and propagating said change to said backup storage, wherein each of said synchronization unit, said client system, said backup storage and said primary storage are implemented as separate units, wherein said client system is implemented external to each of said synchronization unit, said backup storage and said primary storage.

13. The method of claim 12, wherein said monitoring examines packets on said network to determine a database connection being setup to said primary storage, wherein said transaction request is received on said database connection.

14. The method of claim 13, wherein said transaction request is in the form of a SQL query in said one or more packets, and wherein said propagating comprises sending said SQL query to said backup storage to cause said change on said backup storage.

15. The method of claim 14, wherein said primary storage and said backup storage respectively comprise primary server and backup server.

16. A data management system comprising:

a primary database server storing a data;

a secondary database server in which it is desirable to store the same data as in said primary database server, wherein each of said primary database server and secondary database server permits storing and retrieval of data using structured queries and are connected to a network;

a client system sending a transaction request in the form of one or more packets to said primary database server on said network, wherein said one or more packets contain a port number which identifies a transport connection from said client system to said primary database server on said network, wherein said transaction, upon being transported to said primary storage on said network and thereafter being processed in said primary storage causes a change to the data stored by said primary database server; and a synchronization unit examining said one or more packets on said transport connection, when said one or more packets are transported on said network to determine the presence of said transaction request in said one or more packets , said synchronization unit propagating the change to said secondary database server, wherein said synchronization unit is provided external to all of said primary database server, secondary database server and said client system, wherein each of said synchronization unit, said client system, said backup database server and said primary database server are implemented as separate units.

17. The data management system of claim 16, wherein said transaction request is in the form of a SQL query in said one or more packets, and wherein synchronization unit sends said SQL query to said backup database server to propagate the change to said backup database server.

* * * * *

UNITED STATES PATENT AND TRADEMARK OFFICE
CERTIFICATE OF CORRECTION

| | |
|---|---|
| PATENT NO. | : 8,572,026 B2 |
| APPLICATION NO. | : 10/906177 |
| DATED | : October 29, 2013 |
| INVENTOR(S) | : Vedula |

It is certified that error appears in the above-identified patent and that said Letters Patent is hereby corrected as shown below:

In the Claims

In column 8, line 37, in Claim 16, delete "packets ," and insert -- packets, --, therefore.

Signed and Sealed this
Third Day of June, 2014

Michelle K. Lee
*Deputy Director of the United States Patent and Trademark Office*